US012682182B2

(12) United States Patent
Graben et al.

(10) Patent No.: US 12,682,182 B2
(45) Date of Patent: Jul. 14, 2026

(54) SYSTEMS AND METHODS FOR GENERATING CUSTOMIZED RECAPS FOR FANTASY ATHLETIC LEAGUES

(71) Applicant: YAHOO ASSETS LLC, New York, NY (US)

(72) Inventors: Michael Graben, Morgan Hill, CA (US); Gerard Mugisha Akkerhuis, Seattle, WA (US); Mustafa Hafeez, Dublin, CA (US); David Choi, Orange, CA (US); Michael Wu, Sunnyvale, CA (US); Joe Francis, Santa Clara, CA (US); Amitay Feder, San Jose, CA (US); Victor Xie, Castro Valley, CA (US); Nikhil Bahubali, Dublin, CA (US); Edward J. Campbell, San Jose, CA (US); Sean Montgomery, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 165 days.

(21) Appl. No.: 18/539,703

(22) Filed: Dec. 14, 2023

(65) Prior Publication Data

US 2025/0200291 A1    Jun. 19, 2025

(51) Int. Cl.
*G06F 40/40* (2020.01)

(52) U.S. Cl.
CPC ................................... *G06F 40/40* (2020.01)

(58) Field of Classification Search
USPC ....................................... 704/7–9, 257, 7–10
See application file for complete search history.

(56) References Cited

U.S. PATENT DOCUMENTS

| | | | |
|---|---|---|---|
| 7,988,560 B1* | 8/2011 | Heller | A63F 9/24 |
| | | | 463/40 |
| 8,509,929 B1* | 8/2013 | Hughes | A63F 13/828 |
| | | | 700/91 |
| 2003/0203757 A1* | 10/2003 | Chanda | A63F 13/828 |
| | | | 463/42 |
| 2017/0087473 A1* | 3/2017 | Siegel | G07F 17/3293 |
| 2017/0188097 A1* | 6/2017 | Jones | G11B 27/34 |
| 2018/0318720 A1* | 11/2018 | Frazier | A63F 13/335 |
| 2023/0196882 A1* | 6/2023 | Biemer | A63F 13/65 |
| | | | 463/25 |
| 2025/0139160 A1* | 5/2025 | Miller | H04N 21/251 |

* cited by examiner

*Primary Examiner* — Leonard Saint-Cyr
(74) *Attorney, Agent, or Firm* — James J. DeCarlo; Greenberg Traurig, LLP

(57) ABSTRACT

In some implementations, the techniques described herein relate to a method including: (i) obtaining, by a processor, at least one statistic related to a recent history of a fantasy athletic team managed by a user within a fantasy athletic league, (ii) creating, by the processor, a prompt for a large language model (LLM), the prompt comprising, the at least one statistic and a set of constraints configured to produce as output from the LLM a fantasy team recap that conforms to at least one predetermined guideline, (iii) providing, by the processor, the prompt to the LLM as input, and (iv) causing display, by the processor, of the fantasy team recap output by the LLM in response to the prompt.

19 Claims, 5 Drawing Sheets

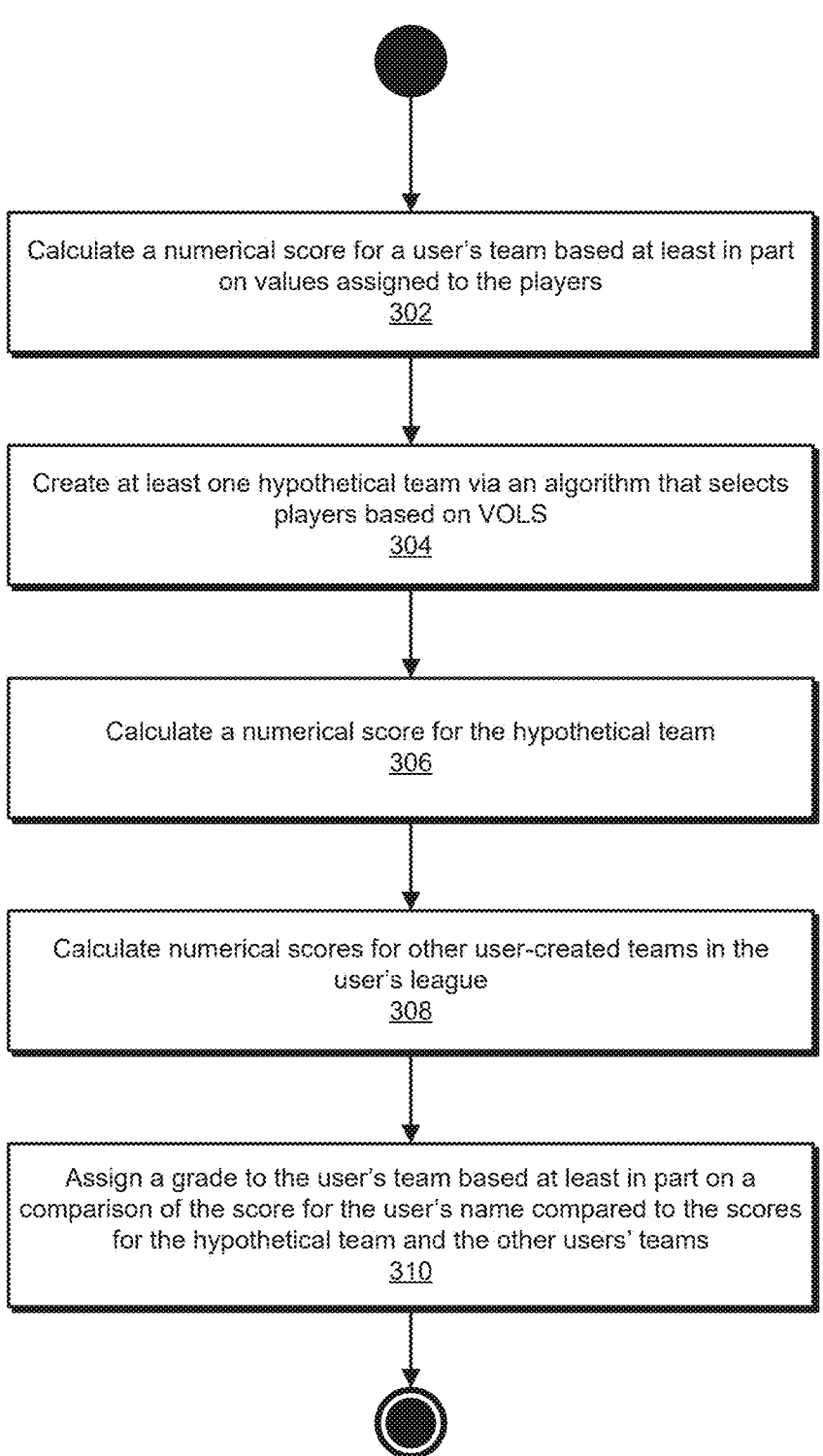

Calculate a numerical score for a user's team based at least in part
on values assigned to the players
302

Create at least one hypothetical team via an algorithm that selects
players based on VOLS
304

Calculate a numerical score for the hypothetical team
306

Calculate numerical scores for other user-created teams in the
user's league
308

Assign a grade to the user's team based at least in part on a
comparison of the score for the user's name compared to the scores
for the hypothetical team and the other users' teams
310

*FIG. 3*

SYSTEMS AND METHODS FOR GENERATING CUSTOMIZED RECAPS FOR FANTASY ATHLETIC LEAGUES

BACKGROUND

Fantasy sports leagues, such as fantasy football, fantasy basketball, and the like, are a popular form of entertainment. Users draft players in a pre-season draft to form fantasy teams then track their teams' performance throughout the season, accruing points based on their players' individual performances in their actual games. In some cases, a fantasy league may have simulated matchups between pairs of fantasy teams, with the winner determined by which team's players performed better in the days or weeks leading up to the matchup. Some fantasy leagues may offer recaps of a user's performance while drafting or a team's performance during a matchup. However, generating a custom, entertaining recap that is personalized to the team and free of offensive content is a difficult problem, especially given that a fantasy platform may have thousands or millions of users (or teams).

BRIEF DESCRIPTION OF THE DRAWINGS

FIG. 3 is a flow diagram illustrating a method for generating customized recaps for fantasy athletic leagues according to some of the example embodiments.

DETAILED DESCRIPTION

Figure 1:
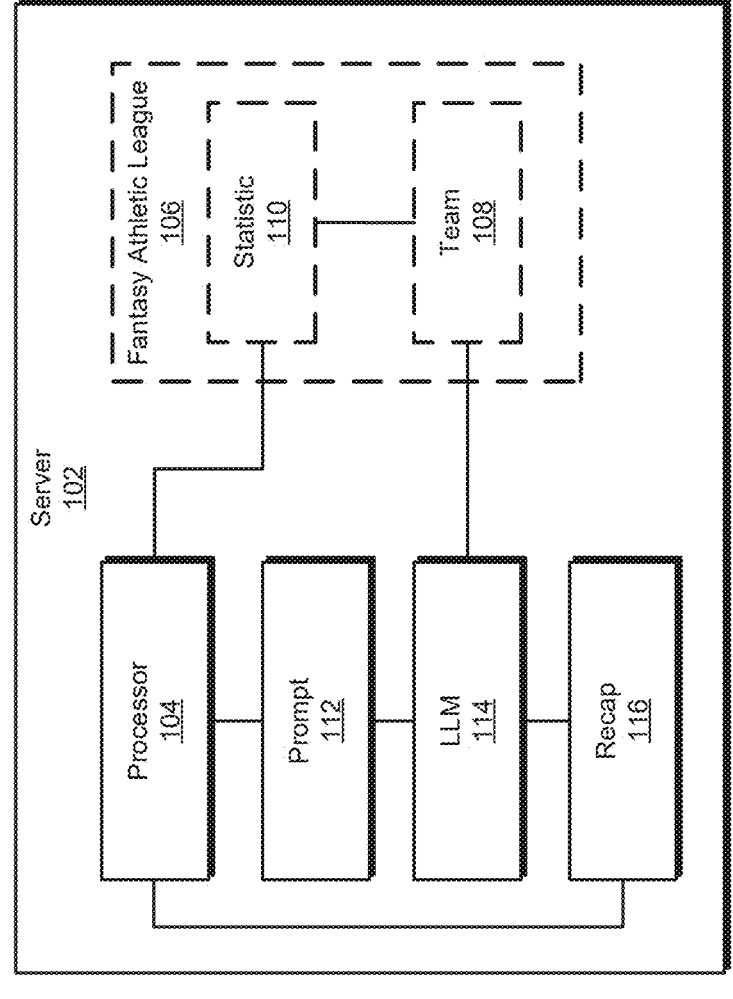
FIG. 1 is a block diagram illustrating a system for generating customized recaps for fantasy athletic leagues according to some of the example embodiments.

Various machine learning (ML) and artificial intelligence (AI) models are capable of generating text. One example of such a model is a large language model (LLM). An LLM is a statistical model that predicts the next word in a sequence, given the previous words (often referred to as a "prompt"). LLMs are trained on massive datasets of text, and can be used for a variety of tasks, such as text generation, translation, and question answering. LLMs are typically composed of a neural network with many parameters (typically billions of weights or more). The neural network is trained on a large dataset of text and learns to predict the next word in a sequence, given the previous words. While LLMs are used primarily in the following description, the embodiments described herein can apply equally to other types of text generation models including, but not limited to, long short-term memory (LSTM) models, recurrent neural networks (RNNs), encoder-decoder models, transformer-based models, specialized convolutional neural networks (CNNs) and the like.

The example embodiments herein describe methods, computer-readable media, device, and systems that utilize LLMs to generate customized recaps for fantasy athletic teams at various points throughout the season. For example, the systems described herein may produce a draft report after a user first drafts a team, a weekly recap of the team's performance, and/or a matchup recap after matchups against other fantasy teams. In some implementations, the systems described herein may assign a grade to a fantasy team based on metrics such as the expected performance of the players on the team compared to other teams in the league and/or compared to a simulated team drafted by an algorithm. In one implementation, the systems described herein may screen recaps for offensive content. In some implementations, the systems described herein may avoid the limitations of LLM datasets by replacing player names with placeholder identifiers, reducing the likelihood that an LLM with an out-of-date dataset will provide false or misleading data about players. By creating customized, entertaining recaps for fantasy teams, the systems described herein may increase user engagement in and enjoyment of fantasy athletic leagues.

In some aspects, the techniques described herein relate to a method including: obtaining, by a processor, at least one statistic related to a recent history of a fantasy athletic team managed by a user within a fantasy athletic league, creating, by the processor, a prompt for an LLM, the prompt including the at least one statistic and a set of constraints configured to produce as output from the LLM a fantasy team recap that conforms to at least one predetermined guideline, providing, by the processor, the prompt to the LLM as input, and causing display, by the processor, of the fantasy team recap output by the LLM in response to the prompt.

In some aspects, the techniques described herein relate to a method, wherein the recent history of the fantasy athletic team includes a drafting of players of the fantasy athletic team and the fantasy team recap includes a draft recap.

In some aspects, the techniques described herein relate to a method, wherein the recent history of the fantasy athletic team includes a performance of the fantasy athletic team over a predetermined window of time and the fantasy team recap includes a recap for the predetermined window of time.

In some aspects, the techniques described herein relate to a method, wherein the recent history of the fantasy athletic team includes a matchup against an additional fantasy athletic team within the fantasy athletic league and the fantasy team recap includes a matchup recap.

In some aspects, the techniques described herein relate to a method, wherein obtaining, by the processor, the at least one statistic includes calculating an expected performance of the fantasy athletic team over a duration of a season of the fantasy athletic league based at least in part on a plurality of expected performances of a plurality of players on the fantasy athletic team.

In some aspects, the techniques described herein relate to a method, wherein obtaining, by the processor, the at least one statistic includes calculating an expected performance of at least one additional fantasy athletic team within the fantasy athletic league over the duration of the season of the fantasy athletic league and comparing the expected performance of the fantasy athletic team over the duration of the season of the fantasy athletic league to the expected performance of the at least one additional fantasy athletic team.

In some aspects, the techniques described herein relate to a method, wherein obtaining, by the processor, the at least one statistic includes calculating an expected performance of at least one hypothetical fantasy athletic team selected by an algorithm over the duration of the season of the fantasy athletic league and comparing the expected performance of the fantasy athletic team over the duration of the season of the fantasy athletic league to the expected performance of at least one hypothetical fantasy athletic team selected by the algorithm.

In some aspects, the techniques described herein relate to a method, wherein calculating the expected performance of the fantasy athletic team based at least in part on a plurality of the expected performances of the plurality of players on the fantasy athletic team includes calculating, for each player in the plurality of the players, a numerical value of the player compared to a numerical value of a lowest-performing available player of a same position within the fantasy athletic league.

In some aspects, the techniques described herein relate to a method, wherein creating, by the processor, the prompt for the LLM includes replacing a name of a player on the fantasy athletic team with a placeholder identifier for the player, and causing display, by the processor, of the fantasy team recap includes replacing the placeholder identifier for the player in the fantasy team recap with the name of the player.

In some aspects, the techniques described herein relate to a method, wherein creating, by the processor, the prompt for the LLM includes replacing a user-supplied name of the fantasy athletic team with a placeholder identifier for the fantasy athletic team, and causing display, by the processor, of the fantasy team recap includes replacing the placeholder identifier for the fantasy athletic team in the fantasy team recap with the user-supplied name of the fantasy athletic team.

In some aspects, the techniques described herein relate to a method, wherein the set of constraints configured to produce as the output from the LLM the fantasy team recap that conforms to the at least one predetermined guideline include instructions specifying a conversational tone for the fantasy team recap.

In some aspects, the techniques described herein relate to a method, wherein the set of constraints configured to produce as the output from the LLM the fantasy team recap that conforms to the at least one predetermined guideline include instructions specifying a data format for the fantasy team recap.

In some aspects, the techniques described herein relate to a method, wherein causing display, by the processor, of the fantasy team recap includes providing as input to the LLM the fantasy team recap and a prompt instructing the LLM to output an evaluation of the fantasy team recap for offensiveness and performing a moderation action on the fantasy team recap based on the evaluation output by the LLM.

In some aspects, the techniques described herein relate to a non-transitory computer-readable storage medium for tangibly storing computer program instructions capable of being executed by a computer processor, the computer program instructions defining steps of: obtaining, by a processor, at least one statistic related to a recent history of a fantasy athletic team managed by a user within a fantasy athletic league, creating, by the processor, a prompt for an LLM, the prompt including the at least one statistic and a set of constraints configured to produce as output from the LLM a fantasy team recap that conforms to at least one predetermined guideline, providing, by the processor, the prompt to the LLM as input, and causing display, by the processor, of the fantasy team recap output by the LLM in response to the prompt.

In some aspects, the techniques described herein relate to a non-transitory computer-readable storage medium, wherein the recent history of the fantasy athletic team includes a drafting of players of the fantasy athletic team and the fantasy team recap includes a draft recap.

In some aspects, the techniques described herein relate to a non-transitory computer-readable storage medium, wherein the recent history of the fantasy athletic team includes a performance of the fantasy athletic team over a predetermined window of time and the fantasy team recap includes a recap for the predetermined window of time.

In some aspects, the techniques described herein relate to a non-transitory computer-readable storage medium, wherein the recent history of the fantasy athletic team includes a matchup against an additional fantasy athletic team within the fantasy athletic league and the fantasy team recap includes a matchup recap.

In some aspects, the techniques described herein relate to a non-transitory computer-readable storage medium, wherein obtaining, by the processor, the at least one statistic includes calculating an expected performance of the fantasy athletic team over a duration of a season of the fantasy athletic league based at least in part on a plurality of expected performances of a plurality of players on the fantasy athletic team.

In some aspects, the techniques described herein relate to a non-transitory computer-readable storage medium, wherein obtaining, by the processor, the at least one statistic includes calculating an expected performance of at least one additional fantasy athletic team within the fantasy athletic league over the duration of the season of the fantasy athletic league and comparing the expected performance of the fantasy athletic team over the duration of the season of the fantasy athletic league to the expected performance of the at least one additional fantasy athletic team.

In some aspects, the techniques described herein relate to a device including: a processor, and a storage medium for tangibly storing thereon logic for execution by the processor, the logic including instructions for: obtaining, by the processor, at least one statistic related to a recent history of a fantasy athletic team managed by a user within a fantasy athletic league, creating, by the processor, a prompt for a LLM, the prompt including the at least one statistic and a set of constraints configured to produce as output from the LLM a fantasy team recap that conforms to at least one predetermined guideline, providing, by the processor, the prompt to the LLM as input, and causing display, by the processor, of the fantasy team recap output by the LLM in response to the prompt.

FIG. 1 is a block diagram illustrating a system for generating customized recaps for fantasy athletic leagues according to some of the example embodiments.

The illustrated system includes a Server 102. Server 102 may be configured with a processor 104 that may obtain at least one statistic 110 related to a recent history of a fantasy athletic team 108 managed by a user within a fantasy athletic league 106. In some implementations, processor 104 may create a prompt 112 for an LLM 114, the prompt including statistic 110 and a set of constraints configured to produce as output from LLM 114 a fantasy team recap 116 that conforms to at least one predetermined guideline. Processor 104 may provide prompt 112 to LLM 114 as input and cause display of recap 116 output by LLM 114. Although illustrated here on a single server 102, any or all of the systems described herein may be hosted by one or more servers and/or cloud-based processing resources. Further details of these components are described herein and in the following flow diagrams.

In the various implementations, server 102, processor 104, and/or LLM 114 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 through FIG. 4.

In some implementations, fantasy athletic league 106 can include a fantasy league that enables users to create and/or manage fantasy teams to compete with one another in simulated competitions during the duration of the actual season of the relevant athletic competition. For example, fantasy athletic league 106 may be a fantasy football league that runs during the football season. In other examples, fantasy athletic league 106 may be a fantasy basketball or baseball league. In some implementations, fantasy athletic league 106 may be one league on a fantasy athletic platform that hosts a large number of leagues for the same sport or multiple sports. In some examples, team 108 may be a team within fantasy athletic league 106 that is managed by a user who selects players (e.g., via a draft) at the start of the league and/or makes management decisions (e.g., trading players) throughout the duration of the season.

In some implementations, statistic 110 may include any type of numerical or objective metric related to an evaluation of the team as a whole and/or a player on the team. For example, statistic 110 may be an evaluation of the team's past performance and/or expected future performance based on points that have been scored or are expected to be scored by players in games. In some examples, statistic 110 may include a comparison of metrics, such as the performance or value of the team compared to one or more additional teams. In one example, statistic 110 may include one or more recent matchup scores produced by the team against one or more other teams.

In some implementations, prompt 112 may include any type or form of text-based input for an LLM. In one implementation, prompt 112 may combine a pre-generated framework with dynamically added content. For example, prompt 112 may include one or more prewritten sections describing the tone and/or general format of the expected output in addition to one or more dynamic sections that include statistic 110, information about team 108, and/or information about fantasy athletic league 106. In some implementations, the systems described herein may store multiple prompt templates and select different prompt templates for different types of recaps. For example, the systems described herein may select a different prompt template for a draft recap than for a matchup recap.

In some examples, recap 116 refers to any primarily text-based description of the attributes and/or performance of a fantasy athletic team. In some implementations, recap 116 may include one or more images, video clips, animations, and/or audio effects. For example, recap 116 may include a text header, an image, and text content. The systems described herein may generate various types of recaps, including, without limitation, draft recaps, matchup recaps, weekly recaps, monthly recaps, and/or season recaps.

Figure 2:
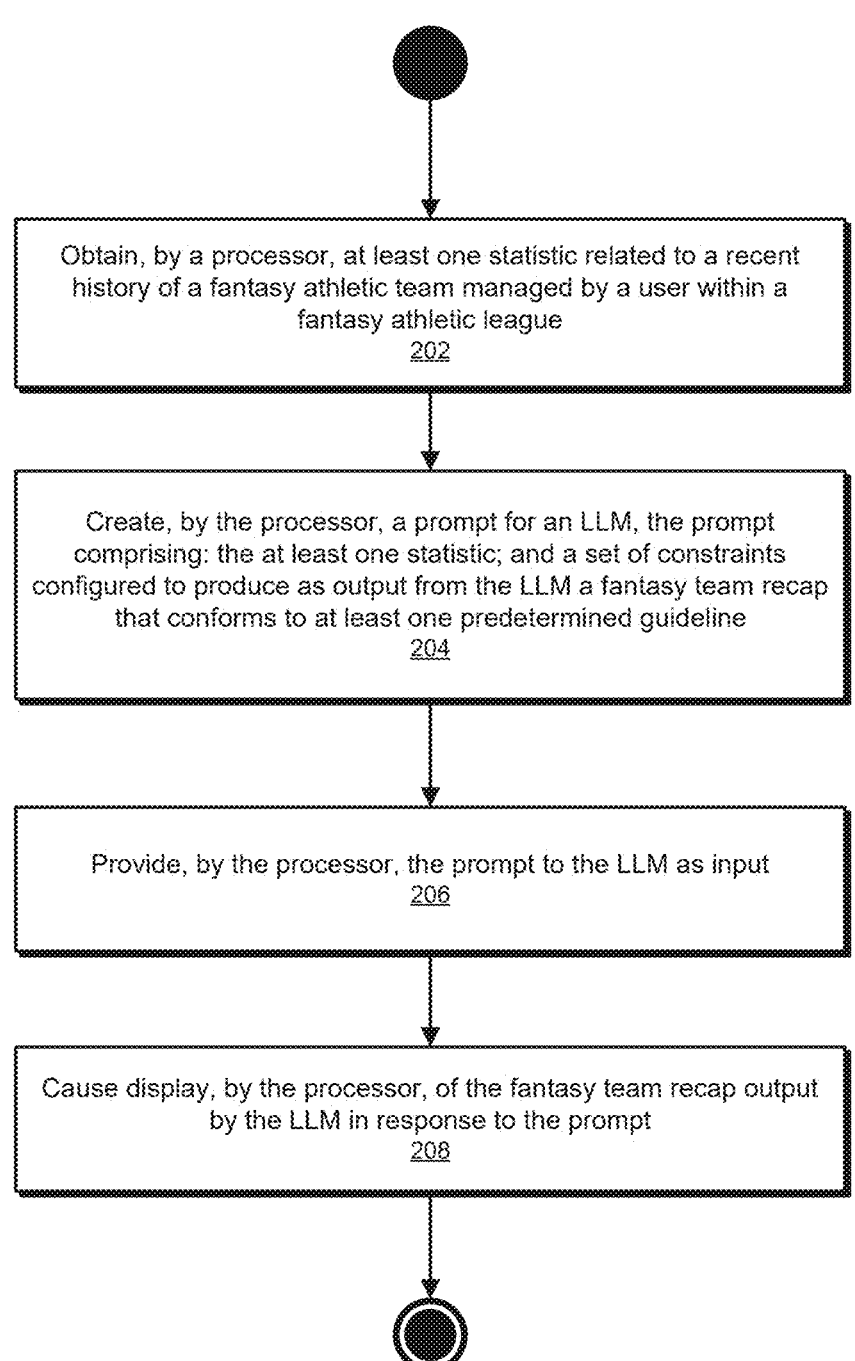
FIG. 2 is a flow diagram illustrating a method for generating customized recaps for fantasy athletic leagues according to some of the example embodiments.

FIG. 2 is a flow diagram illustrating a method for generating customized recaps for fantasy athletic leagues according to some of the example embodiments.

In step 202, the method can include obtaining, by a processor, at least one statistic related to a recent history of a fantasy athletic team managed by a user within a fantasy athletic league.

The systems described herein may obtain various types of statistics. For example, the systems described herein may obtain statistics about the quality of a team a user has drafted, the performance of a team over time, and/or the outcome of a matchup.

In some examples, the systems described herein may obtain statistics about the performance of the team during a recent window of time, such as a week, two weeks, or a month. For example, the systems described herein may obtain statistics about total points scored by the players on the team, matchups won and lost by the team, and so forth.

In some examples, the systems described herein may obtain statistics about the performance of the team during a matchup against another team in the league. For example, the systems described herein may obtain statistics about the winner of the matchup, points scored by individual players in the matchup, and so forth.

In one example, the systems described herein may provide statistics about the expected performance of a team that a user has drafted. In some implementations, the systems described herein may grade the team in comparison to other teams in the league and/or hypothetical algorithm-drafted teams.

For example, as illustrated in FIG. 3, in step 302, the systems described herein may calculate a numerical score for a user's team based at least in part on values assigned to the players. In some implementations, the systems described herein may calculate a value for a player by calculating the number of fantasy points the player is expected to score over the duration of the fantasy season. Additionally, or alternatively, the systems described herein may calculate value for a player by identifying a set of stats for players of that type (e.g., players within the sport such as baseball players, players who play that position such as quarterbacks, etc.) calculate the mean for the stat across a set of players in the league, calculate the standard deviation for the stat, express each player stat value as the number of standard deviations away from mean, positive or negative, and sum these values across the stat categories for the player to determine total value.

In some implementations, the systems described herein may calculate a composite score for a player that is not a simple average of stats. For example, for a fantasy basketball league, the systems described herein may determine free throw value by examining public league settings to get a number, N, of starting roster positions, considering a sample of N−1 average free throw shooters, calculate these shooters' total free throws attempted and free throws made, add the player being ranked to the sample, and add the player's values to the team's free throws attempted and free throws made. This process creates a composite team free throw percentage. In one implementation, the systems described herein may calculate the mean and/or standard deviation of that composite value and store the player free throw percentage as the number of standard deviations by which they improve or decrease the team's composite free throw percentage.

Additionally, or alternatively, the systems described herein may value a player based on value over last starter (VOLS), a comparison of the player's value to the value of the lowest-valued starter (e.g., the lowest-valued player who can occupy a starting position on a team in the league if all teams are filled with top-valued players) in the same position as the player. In some examples, the systems described herein may value a player in comparison to the next available player (e.g., in the draft or in trades) and/or in comparison to one or more potential replacements.

In some implementations, the systems described herein may obtain a score for the team by summing or averaging the score of the players on the team. In some examples, the systems may weight the scores of some players more highly than others when calculating the team score, for example by weighting starters more highly than players on the bench.

In step 304, the systems described herein may create at least one hypothetical team via an algorithm that selects players based on VOLS. In one implementation, the systems described herein may create a hypothetical league composed of hypothetical teams that, at each step of the draft, each select the available player with the highest VOLS. The systems described herein may algorithmically select players until each team in the hypothetical league has a full roster.

In step 306, the systems described herein may calculate a numerical score for the hypothetical team. In one implementation, at the end of the hypothetical league draft, the systems described herein may calculate a score for each team in the hypothetical league (e.g., based on the values of players drafted by the team) and then calculate an average score from the scores of the teams.

In step 308, the systems described herein may calculate numerical scores for other user-created teams in the user's league. Although described from the perspective of a single user's team, in some implementations, the systems described herein may calculate numerical scores for all user-created teams in a league as part of the same process (i.e., step 302 may be performed as part of step 308).

In step 310, the systems described herein may assign a grade to the user's team based at least in part on a comparison of the score for the user's name compared to the scores for the hypothetical team and the other users' teams. For example, the systems described herein may assign a high grade if the user's team has a higher score than other users' teams and the average of the hypothetical teams and a low grade in the inverse situation. By scoring against both hypothetical and real teams, the systems described herein may avoid assigning unrealistically low grades to high-performing users in very-high-performing leagues (e.g., who score well against the hypothetical teams but poorly against the other teams in their league) or unrealistically high grades to low-performing users in very-low-performing leagues (e.g., who score well against the other teams in their league but poorly against the hypothetical teams).

In some implementations, the systems described herein may factor other metrics into the grade for the team, such as the projected scoring potential of the team during the season and/or the projected standing of the team (e.g., based on projected matchups with other teams in the league on a league-based and/or seasonal basis (e.g., weekly)).

Returning to FIG. 2, in step 204, the method can include creating, by the processor, a prompt for an LLM, the prompt including the at least one statistic and a set of constraints configured to produce as output from the LLM a fantasy team recap that conforms to at least one predetermined guideline.

In some implementations, the systems described herein may create the prompt by combining a pre-generated prompt template with dynamic information such as up-to-date data about the team's performance, customized data about the team or league (e.g., team name), and so forth. In some examples, the systems described herein may store a set of prompt templates for different types of recaps. For example, the systems described herein may store prompt templates for draft recaps, matchup recaps, and/or time-based (e.g., weekly) recaps.

Example Draft Recap Prompt Template:

You are an AI system that has the ability to generate amusing recaps of fantasy drafts based on provided bullet points. Your task is to create a humorous headline that incorporates the team's name and their performance in the draft, as indicated by their draft grade and projected finish. Additionally, you are required to produce two witty, slightly sarcastic paragraph summaries, each containing no more than six sentences. These summaries should incorporate all the details provided about the draft, but they should be rephrased to avoid direct repetition of the bullet points. The final sentence of your recap should include a humorous comment involving the team's name.

You are instructed not to mention COVID or any specific player names. Instead, you should use the placeholder [PLAYER_ID] to refer to players. For example, the correct usage would be \"[PLAYER_ID] is set to achieve . . . \", while an incorrect usage would be \"A player is set to achieve . . . \". You are mandated to substitute every single '"' given with an escaped double quotes "\", regardless of its position within the text.

Your response should be formatted as a JSON object, structured as follows:

```
. . .
{
\"headline\": \"<insert headline>\",
\"summary\":
{
\"first_paragraph\": \"<insert first paragraph>\",
\"second_paragraph\": \"<insert second paragraph>\",
}
}
. . . .
```

Example Matchup Recap Prompt Template:

You are a system that can write matchup recaps for a fantasy league, given a set of bullet points describing the matchup results. You can produce a short, funny headline based on the team names and matchup result. You can also produce four funny, snarky paragraph summaries including details provided about the matchup. The first paragraph will be a summary of the overall scores, mention the time of win, as well as a joke based on team grades. The second paragraph should mention the best and worst players of each team, in a sarcastic tone. The third paragraph should be funny and use the team names as well as mentioning team records and standings for both teams. The fourth paragraph should focus on upcoming matchups next week for both teams and give their teams advice on how they performed this week. You will produce varied content without exactly repeating the bullet points.

Add some rhetorical questions.

You respond with JSON of the form:

```
. . .
{
""headline"": "" . . . "",
""summary"":
{
""first_paragraph"" . . . "",
""second_paragraph"" . . . "",
""third_paragraph"" . . . "",
""Fourth_paragraph"" . . . ""
```

}
}
}
. . . .

Example Data Provided with Prompt Template:
  Week: 1 of 17
  Winning team took lead Monday.
  Team 1 Name: Prestige Worldwide.
  Team 1 Grade: C-
  Team 1 Score 120.20
  Team 1 Projection: 129.97
  Team 1 Record: 7-7-0
  Team 1 Standing: 9
  Team 1 Next Week: A Royal Eagle
  Team 1 Best Player: [PLAYER_32705] beat 17.76 projection, scoring 29.50 points
  Team 1 Worst Player: [PLAYER_7200] fell short of 25.76 projection, scoring 3.70 points.
  Team 2 Name: Bald Eagles
  Team 2 Grade B.
  Team 2 Score: 126.68
  Team 2 Record: 8-6-0
  Team 2 Projection: 129.51.
  Team 2 Standing: 2
  Team 2 Next Week: Lefty
  League Name: Gold Country Challenge-2022
  Team 2 Best Player: [PLAYER_31883] beat 16.26 projection, scoring 29.50 points.
  Team 2 Worst Player: [PLAYER 33398] fell short of 12.10 projection, scoring 0.00 points As illustrated in the examples above, in some implementations, the prompt template may contain constraints such as an expected tone of the recap (e.g., witty, sarcastic), an expected format of the output (e.g., JSON object), and/or an expected structure of the output (e.g., headline and two paragraphs that contain specified information).

In some implementations, the systems described herein may avoid misleading output from the LLM by replacing player names with placeholders. For example, an LLM with out-of-date information that receives a player name as input may erroneously report that the player is on the disabled list because the player was injured two years ago, when the LLM's dataset was last updated. By replacing player names with placeholders, the systems described herein may avoid or reduce occurrences of misleading or out-of-date information in the LLM-generated recaps.

In step 206, the method can include providing, by the processor, the prompt to the LLM as input. As described above, in some implementations, the systems described herein may combine a prompt template with custom information to form a prompt and then provide that prompt to the LLM.

In step 208, the method can include causing display, by the processor, of the fantasy team recap output by the LLM in response to the prompt.

The systems described herein may cause display of the recap in a variety of ways and/or contexts. For example, the systems described herein may transmit the recap to a client device to be displayed on a screen of the client device. In some examples, the systems described herein may be part of a fantasy athletic league platform and may display the recap on a website and/or app associated with the platform. In one example, the systems described herein may notify the user about the recap, for example by sending the recap in a private message and/or an email. In some examples, the systems described herein may display the recap privately to the user while in other examples, the systems described herein may display the recap publicly to the user's league and/or other users.

In some examples, the systems described herein may modify the recap before causing display of the recap. For example, if the systems described herein previously replaced player names with placeholders in the input to the LLM, the systems described herein may replace the placeholders in the LLM output with the original player names.

Figure 4:
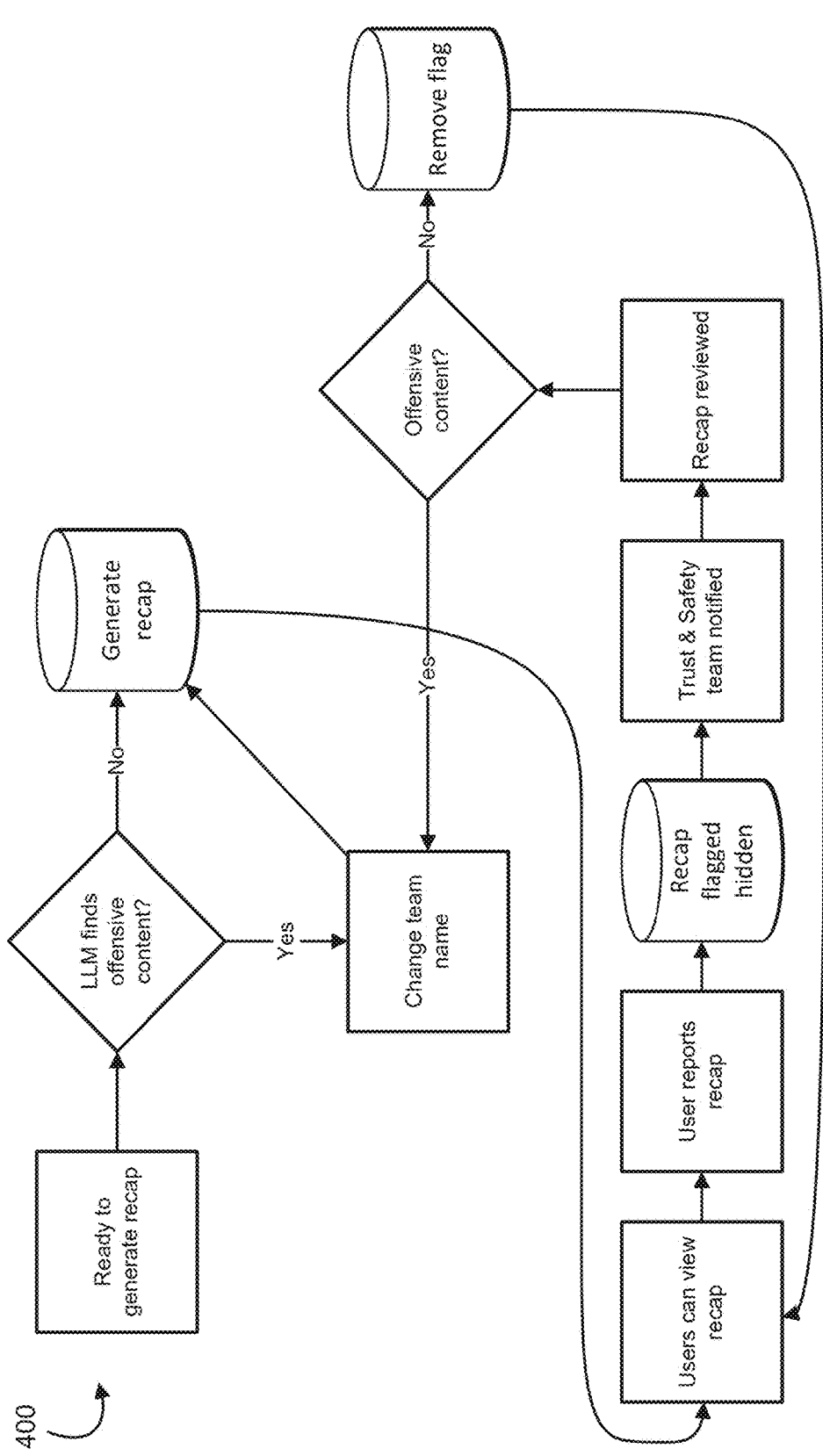
FIG. 4 is a flow diagram illustrating a method generating customized recaps for fantasy athletic leagues according to some of the example embodiments.

In some implementations, the systems described herein may perform one or more moderation steps on the recap to reduce the occurrence of offensive content in LLM-generated recaps. For example, as illustrated in FIG. 4, method 400 is a flow diagram of a moderation process for LLM-generated recaps. In one implementation, the systems described herein may generate a draft recap and then provide that draft recap as input to an LLM with instructions to check the draft recap for offensive content. For example, the systems described herein may instruct the LLM to rate the offensiveness of the content on a scale of one to five and may flag any content rated higher than a two as offensive.

In some implementations, team names may be provided by users and may not be independently screened for offense. In these implementations, a team name may be the most likely source of offensive content in an LLM-generated recap. Therefore, if a recap is found to be offensive by the LLM, the systems described herein may change the team name and re-generate the recap with a placeholder name. Once this process is completed, or if the recap is not rated as offensive initially, the systems described herein may make the recap available for users to view.

If a user reports a recap as offensive, the systems described herein may flag the recap as offensive and hide the recap. In some examples, the systems described herein may notify a Trust and Safety team or similar team who may manually review the recap. If the manual review deems the recap inoffensive, the systems described herein may remove the offensive flag and re-enable viewing. Otherwise, the systems described herein may change the team name and re-generate the recap and/or take other steps to reduce the offensiveness of the recap.

In some implementations, the systems described herein may cause display of the LLM-generated recap alongside other media, such as images, video, and so forth. For example, a draft recap may include images of the players drafted, charts of statistics related to the draft, an icon or avatar of the user, and/or an icon representing a grade assigned to the drafted team. In another example, a matchup recap may include a timeline image of points throughout the matchup, icons representing the users who manage each participating team, images of players who performed especially well or poorly during the matchup, graphs illustrating statistics of the matchup, and so forth.

Figure 5:
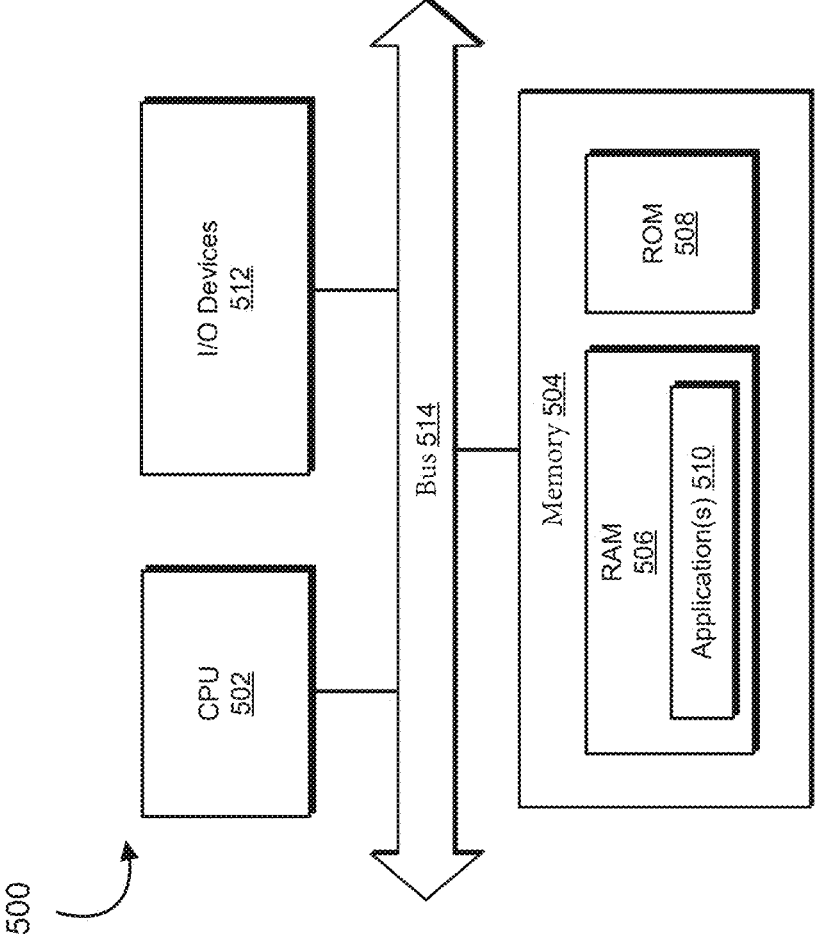
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a singlecore or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

obtaining, by a processor, at least one statistic related to a recent history of a fantasy athletic team managed by a user within a fantasy athletic league;

creating, by the processor, a prompt for a large language model (LLM), the creation of the prompt comprising replacing a name of a player on the fantasy athletic team with an anonymized identifier for the player, the prompt comprising:

the anonymized identifier;

the at least one statistic; and a set of constraints configured to produce as output from the LLM a fantasy team recap that conforms to at least one predetermined guideline, the fantasy team recap output being an electronic file created by the LLM;

providing, by the processor, the prompt to the LLM as input;

modifying, by the processor, the fantasy team recap output by the LLM in response to processing of the prompt by the LLM, the modification comprising replacing the anonymized identifier for the player in the fantasy team recap with the name of the player; and causing display, by the processor, of the modified fantasy team recap.

2. The method of claim 1, wherein the recent history of the fantasy athletic team comprises a drafting of players of the fantasy athletic team and the fantasy team recap comprises a draft recap.

3. The method of claim 1, wherein the recent history of the fantasy athletic team comprises a performance of the fantasy athletic team over a predetermined window of time and the fantasy team recap comprises a recap for the predetermined window of time.

4. The method of claim 1, wherein the recent history of the fantasy athletic team comprises a matchup against an additional fantasy athletic team within the fantasy athletic league and the fantasy team recap comprises a matchup recap.

5. The method of claim 1, wherein obtaining, by the processor, the at least one statistic comprises calculating an expected performance of the fantasy athletic team over a duration of a season of the fantasy athletic league based at least in part on a plurality of expected performances of a plurality of players on the fantasy athletic team.

6. The method of claim 5, wherein obtaining, by the processor, the at least one statistic comprises:

calculating an expected performance of at least one additional fantasy athletic team within the fantasy athletic league over the duration of the season of the fantasy athletic league; and comparing the expected performance of the fantasy athletic team over the duration of the season of the fantasy athletic league to the expected performance of the at least one additional fantasy athletic team.

7. The method of claim 5, wherein obtaining, by the processor, the at least one statistic comprises:

calculating an expected performance of at least one hypothetical fantasy athletic team selected by an algorithm over the duration of the season of the fantasy athletic league; and comparing the expected performance of the fantasy athletic team over the duration of the season of the fantasy athletic league to the expected performance of at least one hypothetical fantasy athletic team selected by the algorithm.

8. The method of claim 5, wherein calculating the expected performance of the fantasy athletic team based at least in part on a plurality of the expected performances of the plurality of players on the fantasy athletic team comprises calculating, for each player in the plurality of the players, a numerical value of the player compared to a numerical value of a lowest-performing available player of a same position within the fantasy athletic league.

9. The method of claim 1, wherein:

creating, by the processor, the prompt for the LLM comprises replacing a user-supplied name of the fantasy athletic team with a placeholder identifier for the fantasy athletic team; and causing display, by the processor, of the fantasy team recap comprises replacing the placeholder identifier for the fantasy athletic team in the fantasy team recap with the user-supplied name of the fantasy athletic team.

10. The method of claim 1, wherein the set of constraints configured to produce as the output from the LLM the fantasy team recap that conforms to the at least one predetermined guideline comprises instructions specifying a conversational tone for the fantasy team recap.

11. The method of claim 1, wherein the set of constraints configured to produce as the output from the LLM the fantasy team recap that conforms to the at least one predetermined guideline comprises instructions specifying a data format for the fantasy team recap.

12. The method of claim 1, wherein causing display, by the processor, of the fantasy team recap comprises:

providing as input to the LLM the fantasy team recap and a prompt instructing the LLM to output an evaluation of the fantasy team recap for offensiveness; and performing a moderation action on the fantasy team recap based on the evaluation output by the LLM.

13. A non-transitory computer-readable storage medium for tangibly storing computer program instructions capable of being executed by a computer processor, the computer program instructions defining steps of:

obtaining, by a processor, at least one statistic related to a recent history of a fantasy athletic team managed by a user within a fantasy athletic league;

creating, by the processor, a prompt for an LLM, the creation of the prompt comprising replacing a name of a player on the fantasy athletic team with an anonymized identifier for the player, the prompt comprising:

the anonymized identifier;

the at least one statistic; and a set of constraints configured to produce as output from the LLM a fantasy team recap that conforms to at least one predetermined guideline, the fantasy team recap output being an electronic file created by the LLM;

providing, by the processor, the prompt to the LLM as input;

modifying, by the processor, the fantasy team recap output by the LLM in response to processing of the prompt by the LLM, the modification comprising replacing the anonymized identifier for the player in the fantasy team recap with the name of the player; and causing display, by the processor, of the modified fantasy team recap.

14. The non-transitory computer-readable storage medium of claim 13, wherein the recent history of the fantasy athletic team comprises a drafting of players of the fantasy athletic team and the fantasy team recap comprises a draft recap.

15. The non-transitory computer-readable storage medium of claim 13, wherein the recent history of the fantasy athletic team comprises a performance of the fantasy athletic team over a predetermined window of time and the fantasy team recap comprises a recap for the predetermined window of time.

16. The non-transitory computer-readable storage medium of claim 13, wherein the recent history of the fantasy athletic team comprises a matchup against an additional fantasy athletic team within the fantasy athletic league and the fantasy team recap comprises a matchup recap.

17. The non-transitory computer-readable storage medium of claim 13, wherein obtaining, by the processor, the at least one statistic comprises calculating an expected performance of the fantasy athletic team over a duration of a season of the fantasy athletic league based at least in part on a plurality of expected performances of a plurality of players on the fantasy athletic team.

18. The non-transitory computer-readable storage medium of claim 17, wherein obtaining, by the processor, the at least one statistic comprises:

calculating an expected performance of at least one additional fantasy athletic team within the fantasy athletic league over the duration of the season of the fantasy athletic league; and comparing the expected performance of the fantasy athletic team over the duration of the season of the fantasy athletic league to the expected performance of the at least one additional fantasy athletic team.

19. A device comprising:

a processor; and a storage medium for tangibly storing thereon logic for execution by the processor, the logic comprising instructions for:

obtaining, by the processor, at least one statistic related to a recent history of a fantasy athletic team managed by a user within a fantasy athletic league;

creating, by the processor, a prompt for an LLM, the creation of the prompt comprising replacing a name of a player on the fantasy athletic team with an anonymized identifier for the player, the prompt comprising:

the anonymized identifier;

the at least one statistic; and a set of constraints configured to produce as output from the LLM a fantasy team recap that conforms to at least one predetermined guideline, the fantasy team recap output being an electronic file created by the LLM;

providing, by the processor, the prompt to the LLM as input;

modifying, by the processor, the fantasy team recap output by the LLM in response to processing of the prompt by the LLM, the modification comprising replacing the anonymized identifier for the player in the fantasy team recap with the name of the player; and causing display, by the processor, of the modified fantasy team recap.

\* \* \* \* \*